UNITED STATES PATENT OFFICE.

CHASE A. STEVENS AND CYRUS BUTLER, OF NEW YORK, N. Y.

IMPROVEMENT IN PACKINGS FOR MACHINERY AND LININGS FOR JOURNAL-BOXES AND BEARING-SURFACES.

Specification forming part of Letters Patent No. 118,295, dated August 22, 1871.

*To all whom it may concern:*

Be it known that we, CHASE A. STEVENS and CYRUS BUTLER, both of the city, county, and State of New York, have invented a new and improved mineral-compound lining for journal-boxes of steam-engines and car-wheels, and for the bearing-surfaces of hangers for shafting, and for lining the surfaces of machinery, whether composed of metal or wood, which is liable to become heated by friction produced by rapid motion, producing thereby what is termed "hot boxes," and for all analogous uses to which the same may be applied; and we do hereby declare the following to be a full, clear, and exact description of the process or method of producing and preparing the same.

This invention relates to improvements in the preparation, compound, or mixture for lining journal-boxes of car-wheels and other bearing-surfaces, where heat is produced at such points of bearing by rapid motion of machinery, axles, shafts, &c., and which is incident to frictional surfaces coming in contact with each other, which lining or preparation tends to prevent, and does prevent, in a very great degree, if not entirely the results referred to.

The process employed in making this compound for linings for bearing-surfaces, packings, &c., is as follows: Take any quantity of prepared asbestus flock and mix with it as much dry pulverized plumbago as it will absorb, in order that the flock may be thoroughly penetrated by the plumbago. In order to impart to the mixture a consistency that will admit of its more easy application to the parts desired and adapt it to use upon bearing-surfaces, there may be applied to the same water, glycerine, oils, or any oleaginous material or substance. By this means are produced bearing-surfaces that will adjust themselves readily to the axles or shafts of wheels, &c., that, to a great extent, will avoid friction or heating of the parts by means of the lubricating qualities of the lining or compound, while at the same time the latter will adhere to the surfaces where the same is placed, filling up all irregular or rough spaces, and become firmly united to the same.

We do not confine ourselves to the exact proportions in the mixture or compound referred to in certain conditions and localities of machinery— a lesser or greater quantity of plumbago may be used; and we hereby disclaim as our invention the means, method, or processes described in the patent of P. S. Devlan, dated September 25, 1860, reissued July 9, 1861; also the patents of William Peters, July 22, 1862; M. Borticher, October 4, 1864, reissued April 30, 1867; P. S. Devlan, August 22 and December 26, 1865; T. B. and W. H. Miller, April 4, 1865; forfeited case of R. Spencer, August 27, 1868; and the rejected case of Thomas & Guyer, filed May, 1869; but What we do claim as our invention, and desire to secure by Letters Patent, is—

1. The process and method of making, preparing, and using the within-described compound or mixture for journal-boxes and bearing-surfaces, when composed of prepared asbestus flock and prepared pulverized plumbago, combined in the manner and for the purpose herein specified.

2. A lining for journal-boxes, bearing-surfaces, and as a packing for machinery, being a compound or mixture composed of prepared asbestus flock, prepared pulverized plumbago, glycerine oil, or other oleaginous or fluid substance, in the manner and for the purpose herein set forth.

CHASE A. STEVENS.
CYRUS BUTLER.

Witnesses:
A. M. BARNARD,
A. L. HAYES.